US010508185B2

(12) United States Patent
Murugesan et al.

(10) Patent No.: US 10,508,185 B2
(45) Date of Patent: Dec. 17, 2019

(54) CONTROLLED RELEASE OF ACTIVATION CHEMICALS FOR THE DEPLOYMENT OF SHAPE MEMORY POLYMERS

(71) Applicants: Sankaran Murugesan, Katy, TX (US); Oleg A. Mazyar, Katy, TX (US); Valery N. Khabashesku, Houston, TX (US)

(72) Inventors: Sankaran Murugesan, Katy, TX (US); Oleg A. Mazyar, Katy, TX (US); Valery N. Khabashesku, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 338 days.

(21) Appl. No.: 15/188,008

(22) Filed: Jun. 21, 2016

(65) Prior Publication Data

US 2017/0362405 A1    Dec. 21, 2017

(51) Int. Cl.
| | |
|---|---|
| *C09K 8/44* | (2006.01) |
| *C08J 9/36* | (2006.01) |
| *B32B 5/18* | (2006.01) |
| *B32B 27/40* | (2006.01) |
| *E21B 33/12* | (2006.01) |
| *E21B 43/08* | (2006.01) |
| *E21B 43/10* | (2006.01) |

(52) U.S. Cl.
CPC ............. *C08J 9/36* (2013.01); *B32B 5/18* (2013.01); *B32B 27/40* (2013.01); *C09K 8/44* (2013.01); *E21B 33/12* (2013.01); *E21B 43/08* (2013.01); *E21B 43/105* (2013.01); *B32B 2266/0278* (2013.01); *C08J 2205/05* (2013.01); *C08J 2205/06* (2013.01); *C08J 2207/00* (2013.01); *C08J 2375/08* (2013.01)

(58) Field of Classification Search
CPC ....................................................... E21B 33/00
See application file for complete search history.

(56) References Cited

U.S. PATENT DOCUMENTS

| | | |
|---|---|---|
| 3,956,508 A | 5/1976 | Mitchell et al. |
| 8,353,346 B2 | 1/2013 | Johnson et al. |

(Continued)

OTHER PUBLICATIONS

"Encapsulator B-390 / B-395 Pro, Technical Data Sheet", Buchi Switzerland; 7 pages.

(Continued)

*Primary Examiner* — William D Hutton, Jr.
*Assistant Examiner* — Avi T Skaist
(74) *Attorney, Agent, or Firm* — Cantor Colburn LLP

(57) ABSTRACT

A method of installing a downhole device comprises introducing a downhole device into a wellbore, the downhole device comprising a substrate and a shape memory polymer in a deformed state disposed on the substrate; combining a modified activation material in the form of a powder, a hydrogel, an xerogel, or a combination comprising at least one of the foregoing with a carrier to provide an activation fluid; introducing the activation fluid into the wellbore; releasing an activation agent in a liquid form from the modified activation material; and contacting the shape memory polymer in the deformed state with the released activation agent in an amount effective to deploy the shape memory polymer.

23 Claims, 2 Drawing Sheets

(56) References Cited

U.S. PATENT DOCUMENTS

| | | | |
|---|---|---|---|
| 2005/0167104 A1* | 8/2005 | Roddy | C04B 40/0641 |
| | | | 166/279 |
| 2008/0206325 A1 | 8/2008 | Bouquerand et al. | |
| 2011/0259587 A1 | 10/2011 | Joseph et al. | |
| 2012/0067577 A1 | 3/2012 | Roddy | |
| 2012/0196007 A1 | 8/2012 | Meyer et al. | |
| 2013/0039980 A1 | 2/2013 | Olmos | |
| 2013/0062061 A1 | 3/2013 | Taylor et al. | |
| 2013/0126170 A1* | 5/2013 | Johnson | E21B 33/00 |
| | | | 166/302 |
| 2013/0256991 A1 | 10/2013 | Ramon et al. | |
| 2014/0174724 A1* | 6/2014 | Livanec | C09K 8/536 |
| | | | 166/247 |
| 2014/0284046 A1 | 9/2014 | Bramwell | |

OTHER PUBLICATIONS

Sudur, et al. "Properties of Hydrogen Peroxide Encapsulated in Silica Hydrogels and Xerogels", Chemical Engineering Department, University of Massachusetts Lowell, Lowell, Massachusetts; 7 pages.

International Search Report, International Application No. PCT/US2017/031531, dated Aug. 30, 2017, Korean Intellectual Property Office; International Search Report 3 pages.

International Written Opinion, International Application No. PCT/US2017/031531, dated Aug. 30, 2017, Korean Intellectual Property Office; International Written Opinion 9 pages.

\* cited by examiner

CONTROLLED RELEASE OF ACTIVATION CHEMICALS FOR THE DEPLOYMENT OF SHAPE MEMORY POLYMERS

BACKGROUND

Shape memory polymers (SMPs) are polymers that regain their original shape when heated above their glass transition temperature (Tg). Articles are formed from shape memory polymers by first heating above the glass transition temperature and shaping the polymer, then subsequently fixing the shape by cooling to below the glass transition temperature. During deployment, the shaped article is heated above the glass transition temperature or slightly below the glass transition temperature to allow recovery of the first molded shape.

Shape memory polymers are useful as materials of construction of elements for a variety of downhole applications, particularly those that require the sealing off of a portion of a borehole or constricting the spacing around an element, whether coaxial with the borehole or otherwise. Shape memory polymers can also be used in sand control applications.

In addition to temperature change, the shape memory effect can also be triggered by an electric or magnetic field, light, contact with a particular fluid or a change in pH. While various methods may be used to deploy shaped articles, alternative effective methods are continuously sought.

BRIEF DESCRIPTION

A method of installing a downhole device comprises introducing a downhole device into a wellbore, the downhole device comprising a substrate and a shape memory polymer in a deformed state disposed on the substrate; combining a modified activation material in the form of a powder, a hydrogel, an xerogel, or a combination comprising at least one of the foregoing with a carrier to provide an activation fluid; introducing the activation fluid into the wellbore; releasing an activation agent in a liquid form from the modified activation material; and contacting the shape memory polymer in the deformed state with the released activation agent in an amount effective to deploy the shape memory polymer.

A method of installing a downhole device comprises introducing a downhole device into a wellbore, the downhole device comprising a substrate and a shape memory polymer in a deformed state disposed on the substrate; contacting the downhole device with a first fluid comprising water; brine; hydrocarbon; or a combination comprising at least one of the foregoing; combining a modified activation material in the form of a powder, a hydrogel, or an xerogel, or a combination comprising at least one of the following with a carrier to provide an activation fluid; pumping the activation fluid into the wellbore at a pressure sufficient to replace the first fluid in the shape memory polymer with the activation fluid; releasing an activation agent in a liquid form from the modified activation material; contacting the shape memory polymer in the deformed state with the released activation agent in an amount effective to deploy the shape memory polymer; and removing the released activation agent from the deployed shape memory polymer.

BRIEF DESCRIPTION OF THE DRAWINGS

The following description should not be considered limiting in any way. With reference to the accompanying drawings, like elements are numbered alike.

DETAILED DESCRIPTION

Figure 1:
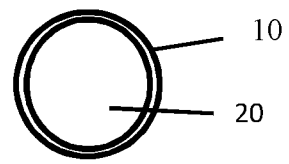
FIG. 1 illustrates a particle of a modified activation material according to an embodiment of the disclosure.

An efficient method of installing a downhole device comprising a shape memory polymer is disclosed. Prior to the installation, the shape memory polymer is heated to a temperature above its glass transition temperature under force to form a shape memory polymer in a deformed state. After the compacted shape memory polymer is positioned at the desired location, it is contacted with an activation agent. The activation agent reduces the glass transition temperature of the shape memory polymer and/or reduces the rigidity of the polymer thus facilitating the deployment of the shape memory polymer. As used herein, deployment means that the shape memory polymer will attempt to return to its original shape or if constrained, the shape memory polymer will conform to the new constrained shape. Preferably, the shape memory polymer is an open cell foam. Bulk shape memory polymer can also be used.

Activation agents are normally liquids at room temperature. Certain components of the activation agents can have a flashpoint of less than 22° C. Such activation agents can be difficult to handle, particularly if used in large amounts. The methods disclosed herein use modified activation materials in a powder form, a hydrogel, or xerogel form. The modified activation materials are easy to transfer from location to location, have a higher flash point, and avoid any potential volatiles associated with certain activation agents. Moreover, the activation agents can be controllably released from the powder, hydrogel, or xerogel by dissolving or corroding the modifying material in water or brine.

As used herein, activation agents are materials that are effective to reduce the glass transition temperature and/or rigidity of the shape memory polymers. Exemplary activation agents include, but are not limited to, dimethyl sulfoxide, ketones, alcohols, glycols, ethers, and a combination comprising at least one of the foregoing. Exemplary alcohols include methanol, ethanol, and isopropyl alcohol. Exemplary glycols include ethylene glycol and propylene glycol. Exemplary ethers include ethylene glycol monobutyl ether (EGMBE). Specific ketones include acetone and acetylacetone. In an embodiment, the activation agents have a flash point less than about 22° C., less than about 20° C., or less than about 18° C., determined according to ASTM_D3828.

The activation agents are normally liquids at room temperature. Modified activation materials are in a powder form, a hydrogel, an xerogel, or a combination comprising at least one of the foregoing. The liquid activation agents can be converted to a modified activation material using a modifying agent.

Suitable modifying agents for the methods disclosed herein include those that are dissolvable in water or brine. As used herein, a material is dissolvable means that the material is soluble in water or brine or reacts with water or brine to form compounds that are soluble in water or brine. As used herein, a compound is soluble if it dissolves in water or brine to provide a solution with a concentration of at least 0.001 moles per liter at room temperature for example at 23° C.

Modifying agents include soluble silicates, carbohydrates, gelatin, polyvinyl alcohol, polyvinylpyrrolidone, polyacrylic acid, or a combination comprising at least one of the foregoing. Carbohydrates include saccharides such as monosaccharides, disaccharides, trisaccharides, oligosaccharides or polysaccharides, derivatives, or combinations thereof. These polysaccharides can be linear (cellulose, amylose), and/or branched (amylopectin, glycogen). They can include carboxyl groups (pectin, alginate, carboxymethyl cellulose) or strongly acidic groups (furcellaran, carrageenan or modified starch). They can be modified chemically by derivatization with neutral substituents (in the case of methyl ethyl cellulose or hydroxypropyl cellulose for instance) or acidic substituents (with carboxymethyl, sulfate or phosphate groups).

The modifying agents can comprise gums and/or hydrocolloids, e.g. gum arabic, gum tragacanth, karaya gum, seaweed or shell extracts like agar, calrrageenan, fucoidan, alginic acid, laminaran, furcellaran and/or chitosan, or microbial polysacchalides e.g. dextran, pulltilan, elsinan, curdlan, scleroglucan, levan, xanthan, gellan, welan gum and rhamsan gum. Gum ghatti, karaya gum, laminaran or pectins may be used in the modifying material.

In an embodiment, the carbohydrate includes a cellulose, a cellulose derivative, a starch, or a starch derivative. A starch derivative includes hydrophobically modified starch such as an alkenyl-succinated starch and starch hydrolysate such as dextrins or maltodextrins, starch ethers, starch esters, crosslinked starch, or oxidized starch. Cellulose derivatives include hydroxymethyl cellulose, hydroxyethyl cellulose, hydroxypropyl cellulose, hydroxypropylmethyl cellulose, methyl cellulose, ethyl cellulose, carboxymethyl cellulose, or sodium carboxymethyl cellulose. Combinations of the materials can be used.

Dissolvable silicates are generally not distinct stoichiometric chemical substances. The dissolvable silicate can comprise about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable silicates. The general formula for dissolvable alkali silicates is $M_2O \ xSiO_2$, where M is Na, K, or Li, and x is the molar ratio defining the number of moles silica ($SiO_2$) per mole of alkali metal oxide ($M_2O$). In an embodiment, the dissolvable silicates comprise at least one of sodium silicate or potassium silicate. Preferably the dissolvable silicates comprise sodium silicate having a formula of $Na_2O.SiO_2$, wherein the weight percent of $SiO_2$ relative to $Na_2O$ is about 3.22:1 to about 1:1, about 3.22:1 to about 2.5:1, specifically about 2:1 to about 1:1.

Figure 2:
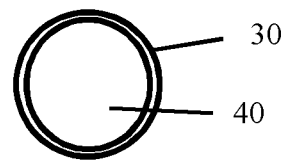
FIG. 2 illustrates a particle of a modified activation material according to another embodiment of the disclosure.

Modified activation material in a powder form can include particles such as capsules having a shell comprising the modifying agent and a core comprising the activation agent. Alternatively, the modified activation material in a powder form can include particles such as capsules having a shell comprising the activation agent and a core comprising the modifying agent. In this instance, the modifying agent in the core can function as a nucleation site for the activation agent to form a solid material. Exemplary embodiments of particles having the core/shell structure are illustrated in FIGS. 1 and 2. In FIG. 1, a modified activation material particle comprises a shell 10 comprising the activation agent and core 20 comprising the modifying agent. In FIG. 2, a modified activation material particle includes a shell 30 comprising the activation agent and the core 40 includes a modifying agent. Although FIGS. 1 and 2 only show particles having a continuous shell, it is appreciated that the shell of the core/shell structure can be continuous or discontinuous.

In some embodiments, the particles of the activation material do not have a core/shell structure. For example, particles of the modified activation material include modifying agent particulates and an activation agent absorbed or adsorbed in the particulates of the modifying agent. The modified activation agent in a powder form can be flowable.

The particle size of the activation material is not particularly limited. In an embodiment, the modified activation material has a particle size less than the pore size of the shape memory polymer foam. In another embodiment, the modified activation material particles have an average size of less than about 100 microns, less than about 50 microns, or less than about 10 microns, less than about 1 micron, or less than about 0.5 micron. The average size of the activation material particles can be greater than about 50 nanometers, greater than about 75 nanometers, or greater than 100 nanometers.

The modified activation materials can be formed by spray drying, spray chilling and cooling, coacervation, encapsulation, fluidized bed coating, rotational suspension separation, pan coating, air suspension coating, centrifugal extrusion, vibrational nozzle, or a combination comprising at least one of the forgoing. Exemplary methods have been described in US. 2008/0206325 and U.S. Pat. No. 3,956,508. Modified activation agents can also be prepared using commercially available instruments such as Encapsulator B-390/B-395 pro.

Hydrogels can be prepared by blending an activation agent with a soluble silicate and an acid such as phosphoric acid, and separating the sol. Hydrogels can be converted to xerogels when they are dried.

The modified activation materials comprise about 0.1 wt. % to about 99.9 wt. % of the activation agent and about 0.1 wt. % to about 99.9 wt. % of the modifying agent. In a specific embodiment, the modified activation materials comprise about 75 wt. % to about 90 wt. % of the activation agent and about 10 wt. % to about 25 wt. % of the modifying agent.

The modified activation material can be combined with a carrier to form an activation fluid. The carrier includes water and brine. Depending on the specific modifying agents used, acids or bases can be added to facilitate the release of the activation agent if desired. Combining the components of the activation fluid is accomplished in a vessel such as a mixer, blender, and the like. In some embodiments, the activation fluid is injected without mixing, e.g. it is injected "on the fly." In an embodiment, the components are combined as the activation fluid is being disposed downhole.

The shape memory polymers include polyurethanes, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, or a combination comprising at least one of the foregoing polymers. The shape memory polymers can be a foam. For sand control applications, the shape memory polymers are open cell foams.

In an embodiment, the shape-memory material is a polyurethane foam. The polyurethane foam is extremely tough and strong and is capable of being compressed and returned to substantially its original non-compressed shape. The polyurethane foam material is made in one non-limiting embodiment from one or more polyol, such as, but not limited to, a polyether, polyester or polycarbonate-based di- or multifunctional hydroxylended prepolymer or polyol, and at least one isocyanate, including, but not limited to, a modified isocyanate (MI) or a modified diphenylmethane diisocyanate (MDI) based monomeric diisocyanate or polyisocyanate, as well as other additives including, but not limited to, blowing agents, molecular cross linkers, chain extenders, surfactants, colorants and catalysts.

The shape memory polymer is able to remain in the deformed state even after applied mechanical force is removed, provided that the shape memory polymer is not heated to a temperature above its glass transition temperature or slightly below its glass transition temperature. Accordingly, in an embodiment, the shape memory polymers have a glass transition temperature that is about 20° C. or about 30° C. higher than actual downhole deployment/application temperature to avoid premature expansion during run-in.

A downhole device comprising a substrate such as a pipe, tubing, or string, and a shape memory polymer disposed on the substrate can be installed by introducing the downhole device into a wellbore; introducing an activation fluid into the wellbore, the activation fluid comprising a carrier and a modified activation material; releasing an activation agent in a liquid form from the modified activation material; and contacting the shape memory polymer in a deformed state with the released activation agent in an amount effective to deploy the shape memory polymer.

The downhole devices include one or more shape memory polymers that are run into the wellbore in a deformed shape or position. Deformed shape memory polymers can be made by compressing or stretching the polymers with a mechanical force at a temperature greater than the glass transition temperature of the polymer. While still in the deformed state, the material is cooled down to a temperature below its glass transition temperature. The shape memory polymers remain in the deformed shape induced on it after manufacture at surface temperature or at wellbore temperature during run-in. After the downhole device having the shape-memory material is placed at the desired location within the well, the shape memory polymer is allowed to recover its pre-deformed shape, i.e., its original, manufactured shape, or recover part of the pre-deformed shape, at downhole temperature at a given amount of time. In an embodiment, the shape memory polymer is deployed to conform to the borehole. In other words, the shape memory polymer covers or deploys to fill the available space up to the borehole wall. The borehole wall will limit the final, recovered shape of the shape memory polymer and not permit it to expand to its original, geometric shape. In this way, the recovered or deployed shape memory polymer will perform the desired function within the wellbore.

An activation fluid can be used to facilitate the deployment of the shape memory polymer. In some embodiment, while introducing the downhole device downhole, the device is contacted with a first fluid comprising water, brine, hydrocarbon, or a combination comprising at least one of the foregoing. If the shape memory polymer absorbs the first fluid, it is preferably to inject the activation fluid at a sufficient pressure to displace the first fluid in the shape memory polymer with the activation fluid.

As disclosed therein the activation fluid comprises a modified activation material in a powder form, a hydrogel, or xerogel form. Advantageously an activation agent can be released from the modified activation material in a liquid form. Methods of releasing the activation agent include dissolving, corroding, or removing the modifying agent in the carrier of the activation fluid via chemical or physical means. Corroding the modifying agent comprises thermal degradation, chemical degradation, catalytic degradation, degradation in response to a pH change, or a combination comprising at least one of the foregoing. The catalyst for the catalytic degradation includes but is not limited to zinc bromide and calcium bromide. In an embodiment, releasing the activation agent is conducted in the presence of sonication or an electromagnetic field.

Without wishing to be bound by theory, it is believed that shape memory polymer chains are coupled via hydrogen bonding. When the shape memory polymer chains are coupled with hydrogen bonding, the polymer chains are more ordered and regular, thus the shape memory polymer is more rigid. The hydrogen bonding also limits the mobility of polymer chains, therefore the material has higher Tg. Further without wishing to be bound by theory, it is believed that an activation agent can disrupt the hydrogen bonding of the polymer chains by engaging in hydrogen bonding themselves with the shape memory polymer chains. As a result of the disruption of the hydrogen bonding, the polymer chains of the shape memory polymer are decoupled from one another and relatively more mobile, therefore, the Tg of the material is lower and the rigidity of the material is reduced, for instance to a second, lower Tg and a second, decreased rigidity, respectively.

The amount of the activation agent effective to affect the Tg and/or the rigidity of the shape memory polymer is a quantity necessary to essentially saturate or soak shape memory polymer that is desired to be affected. In an embodiment, the activation agents contact at least 25 vol %, alternatively at least 50 vol %, and even at least 90 vol % of the shape memory polymer.

The effect of the activation agent is reversible. When the activation agent is removed, the Tg of the polymeric shape memory polymer as well as the original rigidity are restored. Accordingly, in an embodiment, after the shape memory polymer is deployed, the activation agent is removed from the shape memory polymer so that the deployed shape memory polymer can have improved mechanical properties. Removing the released activation agent from the deployed shape memory polymer comprises injecting a third fluid that is free of activation agents into the wellbore, flowing a formation fluid through the shape memory polymer, or a combination comprising at least one of the foregoing.

Surfactants may optionally be used to help remove an activation agent from the shape memory polymer. Suitable surfactants include anionic, cationic, amphoteric, and nonionic surfactants.

When the shape memory polymer is a polymer foam, as a result of the shape memory polymer being expanded to its set position, the open cell porous shape memory foam can prevent production of undesirable solids from the formation and allow only desired hydrocarbon fluids to flow through the shape memory foam. The foam cell pore size, size distribution and cell openness may be adjusted by formulating different components and by controlling processing conditions in such a way that only desired hydrocarbon fluids are allowed to flow through and undesirable solids from the formation are prevented from being produced.

Alternatively, the shape memory polymer may be designed to prevent fluids as well as solids from passing therethrough, in which case the tool is a packer or other isolation device. Thus, suitable downhole devices used in the methods described herein include an expansion tool, a screen, a packer, and an isolation plug.

Figure 3:
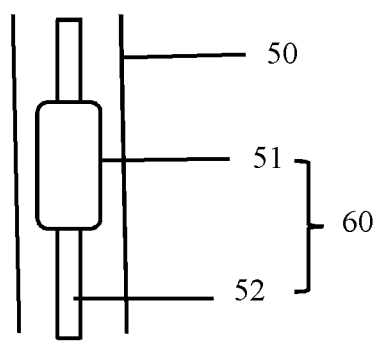
FIG. 3 illustrates an exemplary downhole device before deployment.
Figure 4:
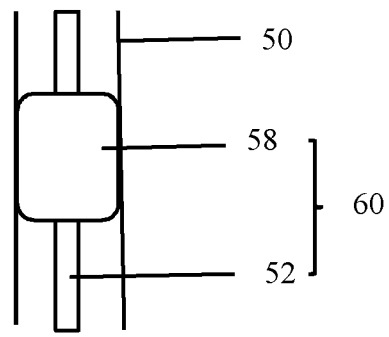
FIG. 4 illustrates a downhole device after deployment according to an embodiment of the disclosure.
Figure 5:
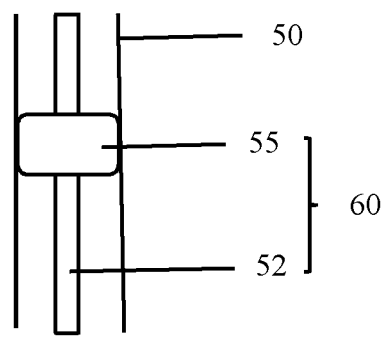
FIG. 5 illustrates a downhole device after deployment according to another embodiment of the disclosure.

FIGS. 3-5 illustrate the deployment of a downhole device 60, which includes a tubing 52 and a shape memory polymer. Before deployment, the shape memory polymer is in a deformed state 51. During the deployment, when the shape memory material is an open cell foam, it expands in the radial direction and conform to the wall of the borehole 50 to provide expanded shape memory foam 58. In the illustrated embodiment, the shape memory material does not expand in the axial direction. When the shape memory material is in a bulk form, during deployment, the shape memory expands in the radical direction and contracts in the axial direction simultaneously to provide a deployed shape memory material 55.

Set forth below are various embodiments of the disclosure.

Embodiment 1

A method of installing a downhole device, the method comprising: introducing a downhole device into a wellbore, the downhole device comprising a substrate and a shape memory polymer in a deformed state disposed on the substrate; combining a modified activation material in the form of a powder, a hydrogel, an xerogel, or a combination comprising at least one of the foregoing with a carrier to provide an activation fluid; introducing the activation fluid into the wellbore; releasing an activation agent in a liquid form from the modified activation material; and contacting the shape memory polymer in the deformed state with the released activation agent in an amount effective to deploy the shape memory polymer.

Embodiment 2

The method of Embodiment 1, wherein the modified activation material comprises a modifying agent.

Embodiment 3

The method of Embodiment 2, wherein releasing the activation agent comprises dissolving the modifying agent, corroding the modifying agent, or a combination comprising at least one of the foregoing.

Embodiment 4

The method of Embodiment 3, wherein corroding the modifying agent comprises thermal degradation, chemical degradation, catalytic degradation, degradation in response to a pH change, or a combination comprising at least one of the foregoing.

Embodiment 5

The method of Embodiment 2, wherein releasing the activation agent is conducted in the presence of sonication or an electromagnetic field.

Embodiment 6

The method of any one of Embodiments 1 to 5, further comprising reducing an original glass transition temperature of the shape memory polymer to less than a downhole deployment temperature after the wellbore device is disposed at a desired downhole location.

Embodiment 7

The method of any one of Embodiments 1 to 6, further comprising removing the released activation agent from the deployed shape memory polymer.

Embodiment 8

The method of any one of Embodiments 1 to 7, wherein the modifying agent comprises a soluble silicate; a carbohydrate; gelatin; polyvinyl alcohol; polyvinylpyrrolidone; polyacrylic acid; or a combination comprising at least one of the foregoing.

Embodiment 9

The method of any one of Embodiments 1 to 8, wherein the modified activation material comprises about 0.1 wt. % to about 99.9 wt. % of the activation agent and about 0.1 wt. % to about 99.9 wt. % of the modifying agent.

Embodiment 10

The method of any one of Embodiments 1 to 9, further comprising forming the modified activation material by spray drying; spray chilling and cooling; coacervation; encapsulation; fluidized bed coating; rotational suspension separation; pan coating; air suspension coating; centrifugal extrusion; or vibrational nozzle; or a combination comprising at least one of the foregoing.

Embodiment 11

The method of any one of Embodiments 1 to 10, wherein the released activation agent comprises a component having a flash point of less than about 22° C. determined according to ASTM D3828.

Embodiment 12

The method of any one of Embodiments 1 to 11, wherein the released activation agent comprises dimethyl sulfoxide; a ketone; an alcohol; a glycol; an ether; or a combination comprising at least one of the foregoing.

Embodiment 13

The method of any one of Embodiments 1 to 12, wherein the carrier comprises water or brine.

Embodiment 14

The method of any one of Embodiments 1 to 13, wherein the shape memory polymer comprises a polyurethane; polyamide; polyurea; polyvinyl alcohol; vinyl alcohol-vinyl ester copolymer; phenolic polymer; polybenzimidazole; polyethylene oxide/acrylic acid/methacrylic acid copolymer crosslinked with N,N'-methylene-b is-acrylamide; polyethylene oxide/methacrylic acid/N-vinyl-2-pyrrolidone copolymer crosslinked with ethylene glycol dimethacrylate; or polyethylene oxide/poly(methyl methacrylate)/N-vinyl-2- pyrrolidone copolymer crosslinked with ethylene glycol dimethacrylate; or a combination comprising at least one of the foregoing.

Embodiment 15

The method of any one of Embodiments 1 to 14, wherein the shape memory polymer comprises a polyurethane.

Embodiment 16

The method of any one of Embodiments 1 to 15, wherein the shape memory polymer is an open cell foam.

Embodiment 17

The method of any one of Embodiments 1 to 16, wherein the downhole device is an expansion tool; a screen; a packer; or an isolation plug.

Embodiment 18

A method of installing a downhole device, the method comprising: introducing a downhole device into a wellbore, the downhole device comprising a substrate and a shape memory polymer in a deformed state disposed on the substrate; contacting the downhole device with a first fluid comprising water; brine; hydrocarbon; or a combination comprising at least one of the foregoing; combining a modified activation material in the form of a powder, a hydrogel, or an xerogel, or a combination comprising at least one of the following with a carrier to provide an activation fluid; pumping the activation fluid into the wellbore at a pressure sufficient to replace the first fluid in the shape memory polymer with the activation fluid; releasing an activation agent in a liquid form from the modified activation material; contacting the shape memory polymer in the deformed state with the released activation agent in an amount effective to deploy the shape memory polymer; and removing the released activation agent from the deployed shape memory polymer.

Embodiment 19

The method of Embodiment 18, wherein removing the released activation agent from the deployed shape memory polymer comprises injecting a third fluid that is free of activation agents into the wellbore, flowing a formation fluid through the shape memory polymer, or a combination comprising at least one of the foregoing.

Embodiment 20

The method of Embodiment 18 or Embodiment 19, wherein the shape memory polymer comprises a polyurethane.

Embodiment 21

The method of any one of Embodiments 18 to 20, wherein the shape memory polymer is an open cell foam.

Embodiment 22

The method of any one of Embodiments 18 to 20, wherein the downhole device is an expansion tool; a screen; a packer; or an isolation plug.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of installing a downhole device, the method comprising:
    introducing a downhole device into a wellbore, the downhole device comprising a substrate and a shape memory polymer in a deformed state disposed on the substrate;
    combining a modified activation material in the form of a powder with a carrier to provide an activation fluid, the modified activation material comprising a modifying agent and an activation agent, the modifying agent comprising a soluble silicate; a carbohydrate; gelatin; polyvinyl alcohol; polyvinylpyrrolidone; polyacrylic acid; or a combination comprising at least one of the foregoing;
    introducing the activation fluid into the wellbore;
    releasing the activation agent in a liquid form from the modified activation material in the presence of sonication or an electromagnetic field; and
    contacting the shape memory polymer in the deformed state with the released activation agent in an amount effective to deploy the shape memory polymer, the deployed shape memory polymer being an open cell foam having a pore size,
    wherein the modified activation material has a particle size less than the pore size of the open cell foam.

2. The method of claim 1, wherein releasing the activation agent comprises dissolving the modifying agent, corroding the modifying agent, or a combination comprising at least one of the foregoing.

3. The method of claim 2, wherein corroding the modifying agent comprises thermal degradation, chemical degradation, catalytic degradation, degradation in response to a pH change, or a combination comprising at least one of the foregoing.

4. The method of claim 1, further comprising reducing an original glass transition temperature of the shape memory polymer to less than a downhole deployment temperature after the wellbore device is disposed at a desired downhole location.

5. The method of claim 1, further comprising removing the released activation agent from the deployed shape memory polymer.

6. The method of claim 1, wherein the modifying agent comprises a soluble silicate; a carbohydrate; gelatin; polyvinylpyrrolidone; polyacrylic acid; or a combination comprising at least one of the foregoing.

7. The method of claim 1, wherein the modified activation material comprises about 0.1 wt. % to about 99.9 wt. % of the activation agent and about 0.1 wt. % to about 99.9 wt. % of the modifying agent.

8. The method of claim 1, further comprising forming the modified activation material by spray drying; spray chilling and cooling; coacervation; encapsulation; fluidized bed coating; rotational suspension separation; pan coating; air suspension coating; centrifugal extrusion; or vibrational nozzle; or a combination comprising at least one of the foregoing.

9. The method of claim 1, wherein the released activation agent comprises a component having a flash point of less than about 22° C.

10. The method of claim 1, wherein the released activation agent comprises dimethyl sulfoxide; a ketone; an alcohol; a glycol; an ether; or a combination comprising at least one of the foregoing.

11. The method of claim 1, wherein the carrier comprises water or brine.

12. The method of claim 1, wherein the shape memory polymer comprises a polyurethane; polyamide; polyurea; polyvinyl alcohol; vinyl alcohol-vinyl ester copolymer; phenolic polymer; polybenzimidazole; polyethylene oxide/acrylic acid/methacrylic acid copolymer crosslinked with N,N'-methylene-bis-acrylamide; polyethylene oxide/methacrylic acid/N-vinyl-2-pyrrolidone copolymer crosslinked with ethylene glycol dimethacrylate; or polyethylene oxide/poly(methyl methacrylate)/N-vinyl-2-pyrrolidone copolymer crosslinked with ethylene glycol dimethacrylate; or a combination comprising at least one of the foregoing.

13. The method of claim 1, wherein the shape memory polymer comprises a polyurethane.

14. The method of claim 1, wherein the downhole device is an expansion tool; a screen; a packer; or an isolation plug.

15. A method of installing a downhole device, the method comprising:
introducing a downhole device into a wellbore, the downhole device comprising a substrate and a shape memory polymer in a deformed state disposed on the substrate;
contacting the downhole device with a first fluid comprising water; brine; hydrocarbon; or a combination comprising at least one of the foregoing;
combining a modified activation material in the form of a powder with a carrier to provide an activation fluid, the modified activation material comprising a modifying agent and an activation agent, the modifying agent comprising a soluble silicate; a carbohydrate; gelatin; polyvinyl alcohol; polyvinylpyrrolidone; polyacrylic acid; or a combination comprising at least one of the foregoing;
pumping the activation fluid into the wellbore at a pressure sufficient to replace the first fluid in the shape memory polymer with the activation fluid;
releasing the activation agent in a liquid form from the modified activation material in the presence of sonication or an electromagnetic field;
contacting the shape memory polymer in the deformed state with the released activation agent in an amount effective to deploy the shape memory polymer; and
removing the released activation agent from the deployed shape memory polymer, the deployed shape memory polymer being an open cell foam having a pore size, wherein the modified activation material has a particle size less than the pore size of the open cell foam.

16. The method of claim 15, wherein removing the released activation agent from the deployed shape memory polymer comprises injecting a third fluid that is free of activation agents into the wellbore, flowing a formation fluid through the shape memory polymer, or a combination comprising at least one of the foregoing.

17. The method of claim 15, wherein the shape memory polymer comprises polyurethane.

18. The method of claim 15, wherein the downhole device is an expansion tool; a screen; a packer; or an isolation plug.

19. The method of claim 1, wherein the modified activation material comprises particles having a shell comprising the activation agent and a core comprising the modifying agent.

20. The method of claim 1, wherein the modifying agents comprises particulates, and the activation agent is absorbed or adsorbed in the particulates of the modifying agent.

21. A method of installing a downhole device, the method comprising:
introducing a downhole device into a wellbore, the downhole device comprising a substrate and a shape memory polymer in a deformed state disposed on the substrate;
combining a modified activation material with a carrier to provide an activation fluid, the modified activation material comprising a modifying agent and an activation agent, the modifying agent comprising a soluble silicate; a carbohydrate; gelatin; polyvinyl alcohol; polyvinylpyrrolidone; polyacrylic acid; or a combination comprising at least one of the foregoing;
introducing the activation fluid into the wellbore;
releasing the activation agent in a liquid form from the modified activation material in the presence of sonication or an electromagnetic field; and
contacting the shape memory polymer in the deformed state with the released activation agent in an amount effective to deploy the shape memory polymer;
wherein the modified activation material is present in the form of the hydrogel or the xerogel.

22. The method of claim 1, wherein the modified activation material has an average particle size of greater than about 50 nanometers to less than about 10 microns.

23. The method of claim 1, wherein the modified activation material has an average particle size of greater than about 75 nanometers to less than about 1 micron.

* * * * *